United States Patent [19]
Guttormsen

[11] Patent Number: 5,658,459
[45] Date of Patent: Aug. 19, 1997

[54] DUAL VELOCITY STRAINER

[75] Inventor: Berwin A. Guttormsen, West Milford, N.J.

[73] Assignee: Unites States Filter Corporation, Palm Desert, Calif.

[21] Appl. No.: 580,812

[22] Filed: Dec. 29, 1995

[51] Int. Cl.⁶ .............................. B01D 24/38; B01D 24/46
[52] U.S. Cl. ........................... 210/279; 210/291; 210/292
[58] Field of Search ................................ 210/291, 279, 210/274, 289, 292

[56] References Cited

U.S. PATENT DOCUMENTS

| | | | |
|---|---|---|---|
| 597,822 | 1/1898 | Martin | 210/291 |
| 688,312 | 12/1901 | Jewell | 210/291 |
| 793,017 | 6/1905 | Mcafee | 210/291 |
| 1,407,397 | 2/1922 | Evans | 210/291 |
| 2,646,126 | 7/1953 | Goodner | 166/5 |
| 2,743,016 | 4/1956 | Pick | 218/169 |
| 3,004,668 | 10/1961 | Adams | 210/293 |
| 3,063,565 | 11/1962 | Burkhardt | 210/190 |
| 3,155,612 | 11/1964 | Weber | 210/291 |
| 3,472,382 | 10/1969 | Soriente | 210/279 |
| 3,730,348 | 5/1973 | Weis | 210/274 |
| 3,817,390 | 6/1974 | Maruniak | 210/460 |
| 3,826,375 | 7/1974 | Fournier | 210/291 |
| 4,162,975 | 7/1979 | Adams | 210/124 |
| 4,319,999 | 3/1982 | Gruesbeck | 210/266 |
| 5,028,322 | 7/1991 | Soriente | 210/232 |
| 5,058,810 | 10/1991 | Bonfiglioli | 239/489 |
| 5,264,121 | 11/1993 | Guzman-Sanchez | 210/117 |
| 5,472,609 | 12/1995 | Field | 210/541 |

FOREIGN PATENT DOCUMENTS

| | | |
|---|---|---|
| 1102367 | 2/1968 | United Kingdom. |
| 2229293 | 9/1990 | United Kingdom. |

OTHER PUBLICATIONS

Leem "Wedge Flow" Sales Brochure.
Owens, "Practical Principles of Ion Exchange Water Treatment", Tall Oaks Press, 1985, pp. 38–45.
Orthos Liquid Systems, Inc. Filter–Nozzles catalog 95.

*Primary Examiner*—Cynthia L. Nessler
*Attorney, Agent, or Firm*—James R. Morgart

[57] ABSTRACT

A pipe-mounted dual velocity strainer is disclosed including a bottom strainer portion to provide a first velocity flow path in one direction and a top strainer portion to provide a second velocity flow path in the opposite direction. A check valve and coaxial conduit between the two strainer portions provide means for obtaining different velocities dependent upon the direction of flow. The invention is utilized in fluid distribution and collection for ion exchange and filtration systems.

22 Claims, 12 Drawing Sheets

DUAL VELOCITY STRAINER

BACKGROUND OF THE INVENTION

1. Field of the Invention

This invention relates to a dual velocity strainer employed in fluid collection and distribution systems for ion exchange and filtration processes. In one aspect, this invention relates to a pipe mounted strainer which will permit different fluid velocities to transit through the strainer, dependent on the direction of fluid flow and which will prevent particulate matter from entering the fluid flow path.

2. Background Information

Properly designed ion exchange and media filtration beds employ means to suitably distribute the flow of a fluid into the bed and to collect the flow out of the bed in a manner that prevents dead spaces or pockets of poorly utilized ion exchange resin or filtration media. It is common in the industry to refer to a system which distributes or collects fluid in a vessel as a "distribution system". The remainder of this specification will use the common terminology of "distributor" or "distribution system" so as to avoid confusion, but it should be understood that a reference to a distributor or distribution system may make reference either to a fluid distribution or to a fluid collection system, or to both.

Laterals in a liquid distribution system include one or more horizontal conduits which are used to distribute a flow of liquid evenly over a plurality of openings in the conduit. The openings may include drilled holes in the conduit, or they may include a series of pipe fittings such as tees or elbows into which a plurality of strainers may be connected. The two designs most widely used for distribution and collection systems within a vessel comprising laterals are the hub-radial and the header-lateral types.

The hub-radial design utilizes a hollow central hub with hollow laterals connected to the hub in a radial fashion, like spokes in a wheel. Holes drilled in the laterals allow the fluid into or out of the laterals. The ends of the laterals are generally capped or plugged. The hub-radial design is generally limited to vessels having a diameter of 48 inches or less. If the hub-radial design is used in larger vessels, the distance between the diverging laterals near the vessel wall becomes too far to give an even distribution of the fluid being collected or for the fluid being distributed.

In order to overcome uneven distribution, some manufacturers of ion exchange and filtration equipment have installed a series of lateral distribution pipes extending perpendicularly from the radial distribution pipes in the same plane as, and near the ends of, the radial distribution pipes.

In order to keep ion exchange or media filter particles from entering the laterals, the laterals may be covered with screen, or they may be buried in a graded gravel bed.

Header-lateral distribution systems consist of a larger header pipe communicating with a plurality of smaller laterals. The header pipe generally enters the vessel at a right angle to the wall of the vessel at a location near the top or bottom of the vessel. The laterals communicate perpendicularly with the header pipe in a common plane which is parallel to the top or the bottom of the vessel in a vertically oriented vessel. The laterals may be constructed in a manner identical to the hub-radial laterals, or they may communicate with a plurality of vertical pipes which, in turn, communicate to a plurality of strainers.

Ion exchange and filtration vessels may be constructed as either spherical or cylindrical pressure vessels. The use of spherical vessels has been limited to high pressure applications where the wall thickness of a conventional cylindrical vessel would be prohibitive.

A spherical vessel utilizing both hub-radial and header lateral distribution is described in U.S. Pat. No. 3,063,565.

It is more common practice to construct ion exchange and filtration vessels with a cylindrical side wall and dished head ends. This practice is the most economical means to construct such vessels designed to withstand internal pressures of up to about 300 pounds per square inch above the external atmospheric pressure.

Many ion exchange systems are designed with a graded gravel subfill in the bottom dish to act as a support for the ion exchange or filtration media. Typical graded subfills consist of a 4" layer of ½"×¼" quartz, a 4" layer of ¼"×⅛" quartz, and a 4" layer of No. 4 quartz.

The distribution system may either be buried in the subfill, or it may lie just on the surface of the subfill. If the distribution system is buried in the ¼"×⅛" layer of the subfill, the holes in the distributors need not be screened to prevent ion exchange or filtration media from entering the distribution system.

If the distribution system lies on the surface of the subfill, a means must be provided to prevent the ion exchange or filtration media from entering the distribution system. Such means commonly comprise a plastic or metal screen material. The lateral pipes may also be enclosed with either a plastic or metal wellscreen material.

The distribution system is commonly connected to a vertical riser pipe which exits the bottom of the vessel and connects to the external piping and valves of the system.

A header-lateral distribution system utilizing strainer nozzles is described in U.S. Pat. No. 3,826,375.

In order to prevent stagnant areas in the subfill of ion exchange systems where regenerant chemicals may collect and possibly leach out during the subsequent service cycle, it is common practice to provide a series of weep holes in the vertical riser pipe to allow a slight flow of liquid through the gravel subfill which will gradually flush any residual chemicals from the subfill area.

A gravel subfill may be unacceptable in applications where leaching of chemicals from the gravel, such as silica, may prove detrimental to the process. High purity water applications for the semiconductor and power industries would preclude the use of a gravel subfill in ion exchange vessels. Gravel subfills are also undesirable in mixed bed ion exchange applications, where compressed air is introduced into the bottom of the bed for the purpose of mixing two or more types of ion exchange resins. Such agitation would disturb the graded gravel subfill, resulting in the entrainment of ion exchange resin in the subfill and the entrainment of gravel in the ion exchange bed.

In applications where gravel subfills are not desirable, a flat plate is constructed over the lower dished head, providing a "flat false bottom" to the vessel. Such a plate is usually supported on its underside by a series of concentric rings which are sized to provide support between the inside of the dished head and the underside of the false bottom.

U.S. Pat. No. 3,004,668 describes a vessel underdrain system comprised of a curved false tank bottom with a series of strainers protruding into the vessel from the false tank bottom.

Strainers constructed of substantially cylindrical well screen material are described more fully in U.S. Pat. No. 2,743,016.

Other strainers designed for mounting into bottom-plate supported beds are described in U.S. Pat. No. 3,472,382 and U.S. Pat. No. 3,730,348.

It is desirable for distribution systems to serve multiple functions. For instance, the underdrain system of an ion exchange bed should be capable of evenly collecting the flow of fluid during a service cycle. Such flows generally range between 8 and 20 gallons per minute for every one square foot of resin bed area and may go as high as 50 to 60 gallons per minute for every square foot of resin bed area. Service flows are generally in a downward direction, from the top of the bed to the bottom. The same underdrain system may be required to provide a reverse flow in the range of 4 to 5 gallons per minute per square foot of resin bed area during the backwash cycle, which is generally in an upward direction from the bottom of the bed to the top. This reverse flow through the bed is generally known as a backwash cycle.

The backwash cycle 1) removes dirt and broken or fine ion exchange particles; 2) removes any channeling or compaction of the bed, and, in the case of a mixed bed ion exchanger, 3) hydraulically separates the more dense cation exchange resin from the less dense anion exchange resin into two distinct layers so that the two resins may be regenerated with different chemicals.

It is also desirable for the underdrain system to collect the fluid during the service cycle at a low velocity, in order to prevent excessive pressure drop across the distribution system which would waste energy and may promote undesirable uneven channeling of the fluid through the ion exchange particles. However, the underdrain should provide a relatively high velocity fluid distribution flow path during the backwash cycle. This high velocity flow path should provide a planar scrubbing action across the junction of the ion exchange resin particles and the bottom of the vessel, in order to provide an even lifting motion which will backwash all of the resin particles.

Cation exchange resins are commonly regenerated with aqueous solutions of sulfuric acid, hydrochloric acid, sodium carbonate, or sodium chloride, depending on the particular resin and application. Other chemicals such as nitric acid, phosphoric acid, sodium hydroxide, potassium hydroxide, and ammonium hydroxide may also be used as regenerants, depending upon the application. Concentrations of these chemicals range from about 0.5% to about 15% by weight when used as regenerants for ion exchange resins. Anion exchange resins also can be regenerated with the above chemical solutions, depending upon the resin and application, but the most common anion exchange regenerants are sodium hydroxide and ammonium hydroxide solutions. Concentration ranges for the anion regenerants are essentially identical to the cation exchange regenerants. Flow rates for ion exchange resin regenerants typically range from two to five times less than the service flow rate through the same resin bed.

In the case of a mixed bed ion exchange bed, the underdrain system will also be used for the distribution of acid regenerant with a flow path countercurrent to the flow path during the service cycle. The flow of acid regenerant into the cation portion of the resin bed is generally at a much lower flow rate than the flow rate during the service cycle. The kinetics of the ion exchange process require this slower flow rate in order to achieve as complete a regeneration of the ion exchange resin as possible.

Many single resin ion exchange beds also utilize a regenerant flow which is countercurrent to the service flow. Regenerant flow rates in these systems are also generally much slower than the service flow rate. These systems claim a lower leakage of ions in subsequent service runs because the last portion of ion exchange resin to contact the liquid being purified has also been exposed to the largest portion of fresh regenerant chemical. In countercurrently regenerated systems, it is of particular importance for the relatively low flow rate of the regenerant solution to exit the distributor at a relatively high velocity in order to make intimate contact with all of the resin between the distributors. Any resin near the distributors which does not become completely regenerated will cause undesirable leakage of ions during the subsequent service cycle and will negate the advantages of the countercurrently regenerated ion exchange system.

In some cases, where the service flow rate and the backwash flow rate are very different, a separate service collector and backwash distributor are installed adjacent to each other, each communicating to external piping through a separate connection. Although such systems may be necessary to provide an even distribution or collection of liquid, they are more expensive than single distributor systems, and they are difficult to install and maintain.

Packed bed ion exchange systems may have a service cycle in which the flow of fluid is from the bottom of the bed to the top of the bed. The vessels utilized in these systems generally have both a flat false top and a flat false bottom. They may be packed completely with ion exchange resin or they may only be partially packed with ion exchange resin. In the latter case, the flow rate is usually high enough to hydraulically lift the bed and pack it against the top of the vessel as a plug. A small portion of the resin bed may remain fluidized. These same beds are generally regenerated in a direction opposite to the service flow direction, from the top of the bed to the bottom. In this case it would be desirable for the upper distributor also to operate in two velocity modes. The lower velocity mode would be adapted to the faster flow rate of the service cycle, and the higher velocity mode would be adapted to the lower flow rate of the regeneration cycle.

For these reasons, it is desirable for the distribution system in many ion exchange systems to have the dual capability of collecting a fluid at a low velocity and distributing a fluid at a higher velocity.

A detailed description of various types of fluid distribution and collection systems can be found in Chapter 5 of Practical Principles of Ion Exchange Water Treatment by Dean Owens, published by Tall Oaks Publishing, Inc., 1985.

U.S. Pat. No. 1,407,397 describes a strainer for a media filter with a flapper plate which is closed on a series of narrow channels during a downflow service cycle. A higher pressure drop is produced across the strainer during the service cycle, because of the narrow channel flow paths, resulting in even distribution of the flow among the plurality of strainers. When the filter is backwashed, generally at a higher flow rate than the service cycle, the reverse flow lifts up the flapper, exposing a larger flow path to the backwashing fluid. This strainer was designed for backwashing filters which utilize subfill and a header lateral distribution system and is operable only at the bottom of a vessel.

U.S. Pat. No. 4,162,975 discloses a dual velocity strainer. The disclosed system is preferably used with vessels which have a false bottom with perforations therein of the size adapted to accept the strainer. Retrofitting this strainer into existing equipment which does not have a perforated strainer plate would not be practical.

INTRODUCTION TO THE INVENTION

There is a need for a pipe-mounted dual velocity strainer which can be mounted at the ends of vertical lengths of pipe in a vessel collection and distribution system, either in the upper or lower portion of a vessel, rather than be limited to being mounted into perforated false vessel bottoms. Such a pipe-mounted dual velocity strainer would replace conventional less efficient distribution and collection in existing vessels which do not have a perforated false tank bottom.

It is an object of this invention to provide a pipe-mounted dual velocity strainer that has a lower velocity flow path when operated in one direction of flow and has a higher velocity flow path when operated in the reverse direction of flow.

It is a further object of this invention to provide a pipe-mounted dual velocity strainer which may be mounted at the ends of vertically disposed pipes which are connected to a fluid distribution and collection system.

It is still a further object of this invention to provide a pipe-mounted dual velocity strainer which will prohibit the passage of particulate matter while allowing liquid to freely pass.

These and other objects of the invention will be fully understood from the following detailed description of the invention and from the drawings appended to this application.

SUMMARY OF THE INVENTION

The pipe-mounted dual velocity strainer of the present invention has met the above needs.

The pipe-mounted dual velocity strainer of the present invention includes a substantially cylindrical high velocity first strainer portion and a low velocity second strainer portion unit separated by a check valve with a central conduit therethrough. In one aspect of this invention, the high velocity strainer unit is positioned at the vessel bottom with the low velocity strainer unit disposed directly above the high velocity strainer unit. In another aspect of this invention, the high velocity strainer unit is positioned at the vessel top with the low velocity strainer unit disposed directly below the high velocity strainer unit. Fluid is collected through both high and low velocity strainer units and is passed to a fluid collection system through a connecting port an the end of the low velocity strainer. Fluid passing in the reverse direction through the fluid distribution system is prevented from passing through the low velocity strainer by a check valve means and is diverted through the central conduit to the high velocity strainer unit.

DESCRIPTION OF A PREFERRED EMBODIMENT

Figure 1:
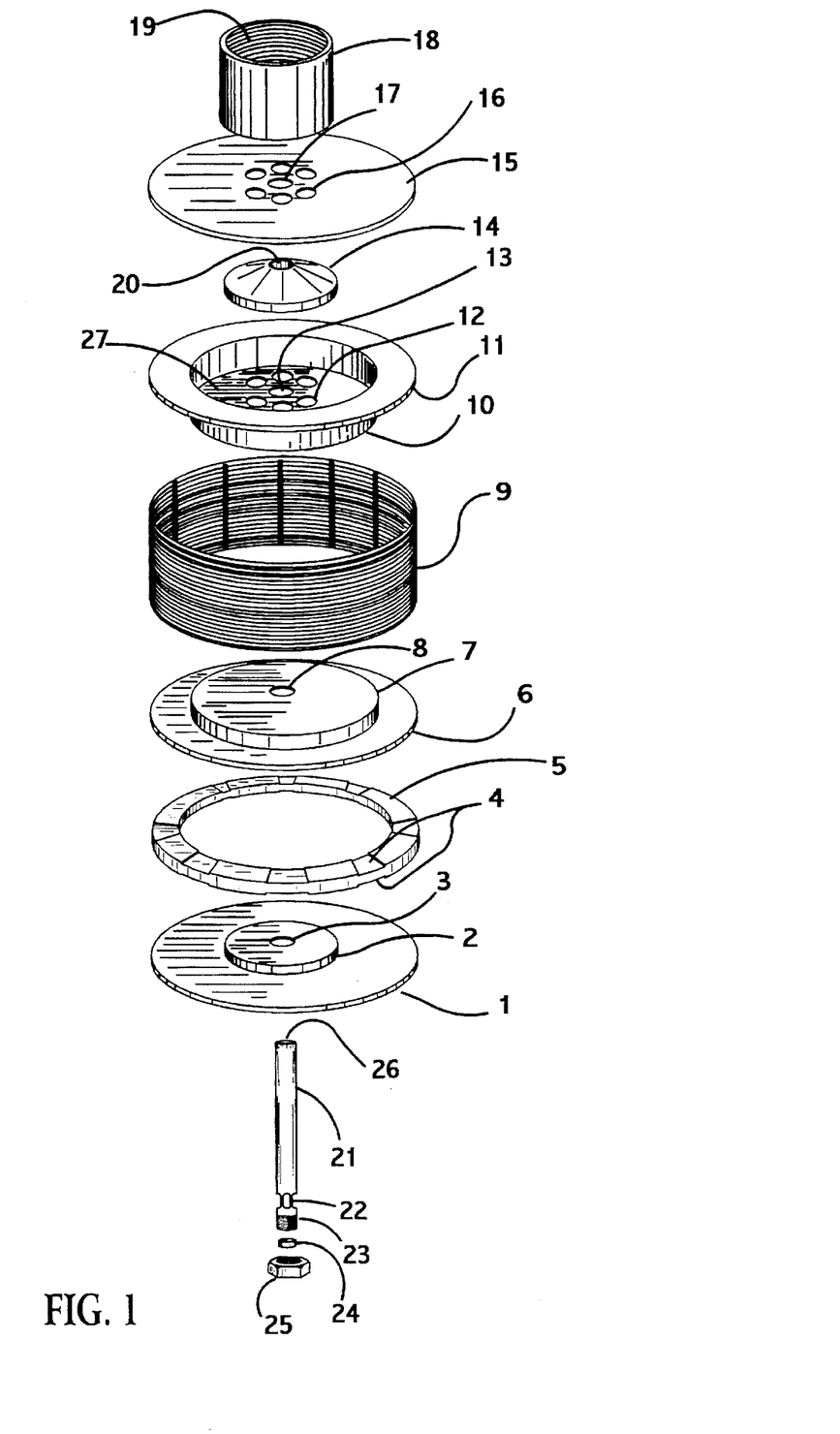
FIG. 1 is an exploded perspective view of a preferred embodiment of the invention.

Referring now to FIG. 1, an exploded perspective view is shown of a preferred embodiment of the invention. Lower plate 1 is a circular plate with a recess in the central portion thereof, in order that nut 25 may be flush with lower plate 1. Slotted ring 5 is annulus shaped with a series of eight slots 4 machined on the top surface and eight slots 4 machined on the bottom surface thereof. The slots 4 are of equidistant spacing around the ring and are about 20–25 degrees in peripheral length, or more preferably about 22.5 degrees in peripheral length. The slots 4 are about 0.005 to 0.010 inches in depth, or more preferably about 0.007 inches in depth. When the pipe-mounted dual velocity strainer is assembled, the combination of lower plate 1, slotted ring 5, and intermediate plate 6 will define a compartment with peripheral access thereto through slots 4. Central opening 3 in lower plate 1 and central opening 8 in intermediate plate 6 are adapted for receiving a conduit 21 with a bore 26 therethrough. Screen 9 is a substantially cylindrical commercially available slotted wedge-wire well screen such as provided by Leem Filtration Products, Mahwah, N.J., under the trade name "Wedge Flow". The screen may be purchased in several models, each with a different slot size. Slot sizes between about 0.006 inch and about 0.025 inch may be used with the invention, or more preferably about 0.007 inch. The open area of slots per strainer can range from about 0.5 square inches to about 3 square inches, depending upon how large a piece of wedgewire screen is used. For example, a 3.3 inch diameter piece of wedgewire screen that is 2 inches high and has 0.007 inch wide slots would have a total open slot area of 2.12 square inches. Spacing of the strainers in the distribution system should be about one to two strainers for every square foot of vessel cross-sectional area, or more preferably about one strainer for every square foot of vessel cross-sectional area.

Check valve rest plate 11 has a central opening 13 for receiving conduit 21 and a plurality of openings 12 arranged radially around central opening 13. Check valve restraining plate 15 has a central opening 17 for receiving conduit 21 and a plurality of openings 16 arranged radially around central opening 17. Floor 27 of check valve rest plate 11 has a recess 10 to enable check valve 14 to move vertically within the compartment defined by check valve rest plate floor 27, check valve rest plate recess 10, and check valve restraining plate 15. Check valve 14 has an axial central opening 20 adapted for slidably mounting check valve 14 on conduit 21. Check Valve 14 may be constructed of a thermoplastic material such as polytrifluoroethlyene (PTFE). Conduit 21 has four slots 22 and threads 23 at one end for receiving a nut 25. Plug 24 provides a fluid-tight obstruction in bore 26. Conduit 21 extends vertically through central openings in lower plate 1, intermediate plate 6, check valve rest plate 11, and through check valve restraining plate 15. Conduit 21 may be fixably attached to check valve restraining plate 15 by gluing means, welding means, threading means or swaging means, depending upon the material of construction. Nut 25 is tightened sufficiently to prevent any undue movement of any of the components. Coupling 18 is fixably attached to check valve restraining plate 15 and provides communication between the dual velocity strainer assembly and a fluid distribution system. Coupling 18 may be either a socket weld type or threaded type pipe coupling, depending upon the material of construction and the design of the fluid distribution and collection system. All components of the pipe-mounted dual velocity strainer except for the check valve may be constructed of a stainless steel or of a plastic material suitable for the working environment. The stainless steel may be of type 316, type 316L, type 304, or type 304L for standard water applications or of Alloy C-276 for applications where the strainer will be exposed to corrosives such as hydrochloric acid. Other alloys such as Carpenter 20 and Hastalloy C may also be used if the environment so dictates. The check valve may be constructed of stainless steel but is preferably constructed of a thermoplastic such as polytrifluoroethylene (PTFE). In situations where the invention will be used in an inverted position at the top of a vessel, it may be desirable to construct the check valve of a material of a lower density than the fluid environment to which the invention is exposed. This will allow check valve 14 to float against check valve rest plate 11, thus blocking the plurality of openings 12 during no flow or low flow conditions. A suitable lower density material for such applications would be high density polyethylene (HDPE).

Figure 2:
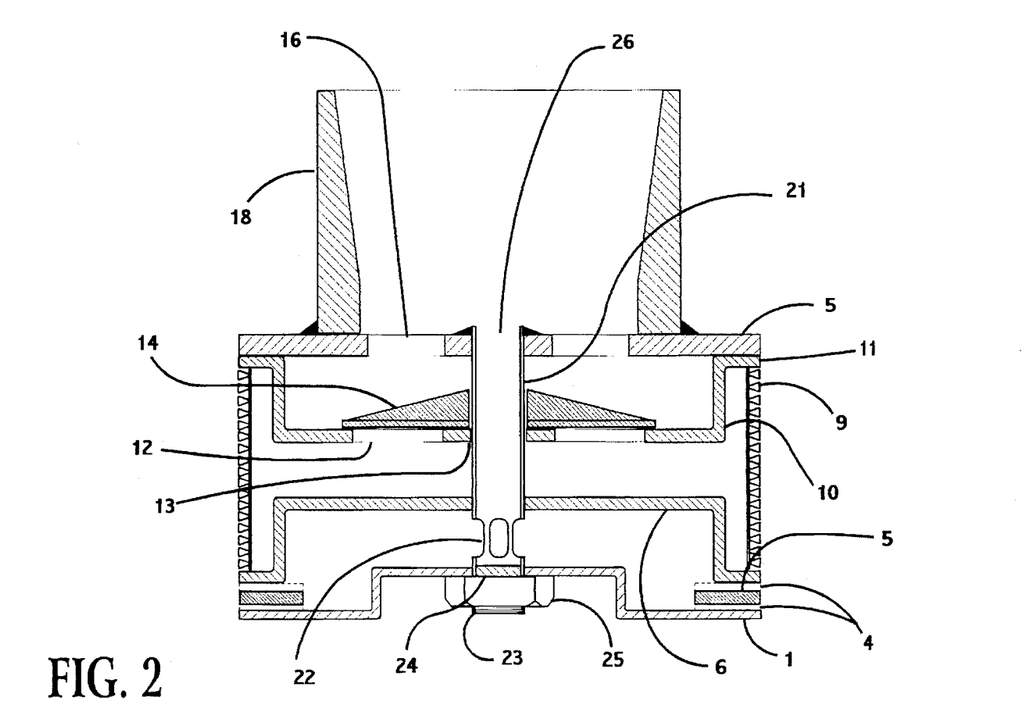
FIG. 2 is an elevational view, partially in section, of a preferred embodiment of the invention.

Referring now to FIG. 2, a cross sectional view of a preferred embodiment of the invention is shown.

Figure 3:
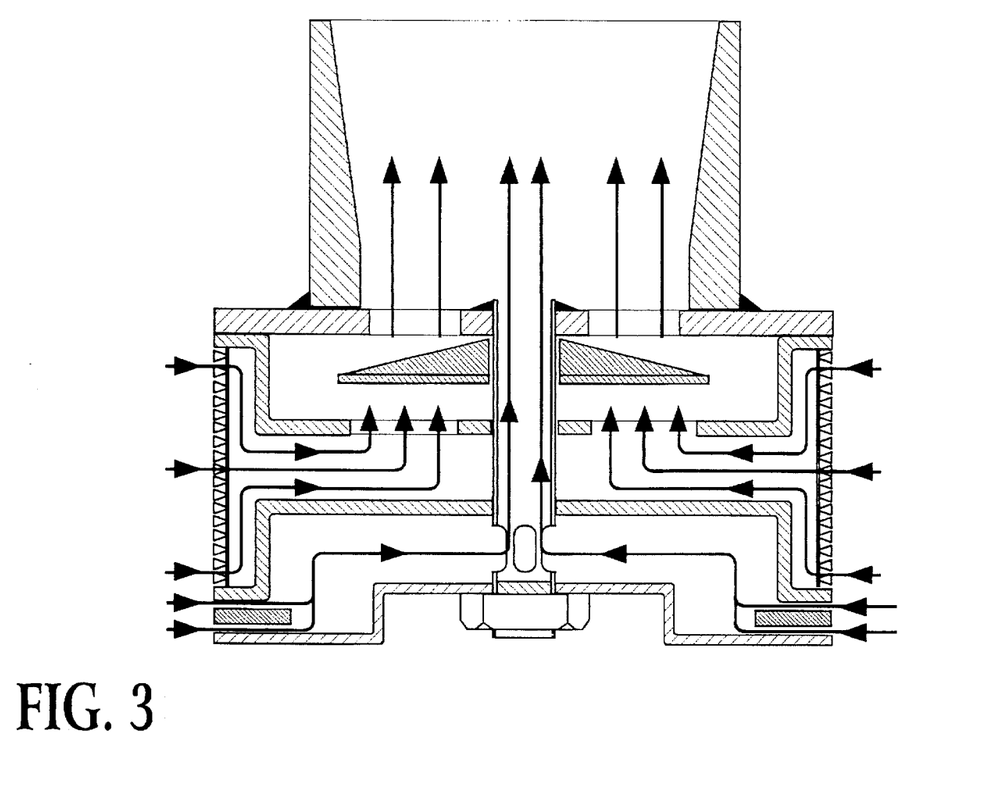
FIG. 3 is an elevational view, partially in section, of a preferred embodiment of the invention in the lower velocity fluid collecting mode.

Referring now to FIG. 3, a cross sectional view of a preferred embodiment of the invention is shown and illustrates the fluid flow path when the pipe-mounted dual velocity strainer is used as a fluid collector and shows the check valve in the open position. Both the slots 4 and the well screen 9 (FIG. 2) are used to collect the fluid in this mode.

Figure 4:
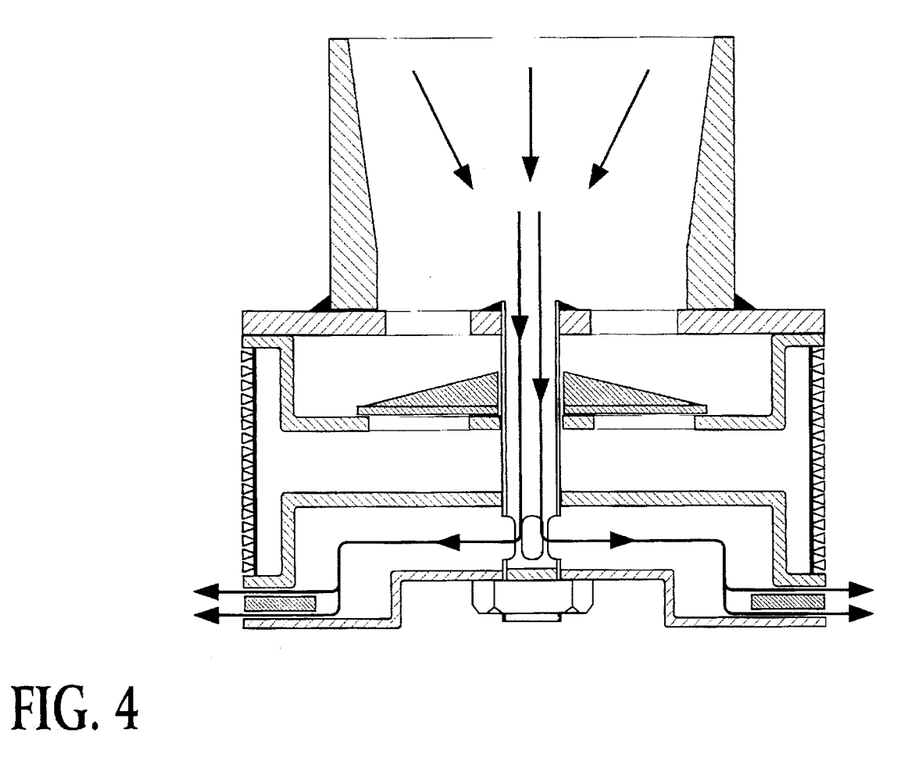
FIG. 4 is an elevational view, partially in section, of a preferred embodiment of the invention in the higher velocity fluid distributing mode.

Referring now to FIG. 4, a cross sectional view of a preferred embodiment of the invention is shown and illustrates the fluid flow path when the dual velocity strainer is used as a fluid distributor and shows the check valve in the closed position. All of the fluid is diverted through bore 26 and through the slotted portion of the strainer where the fluid is forced through the slots 4 (FIG. 2) at a velocity relatively higher then when the fluid is collected through both the screen 9 and the slots 4 (FIG. 2) in the reverse direction.

Figure 5:
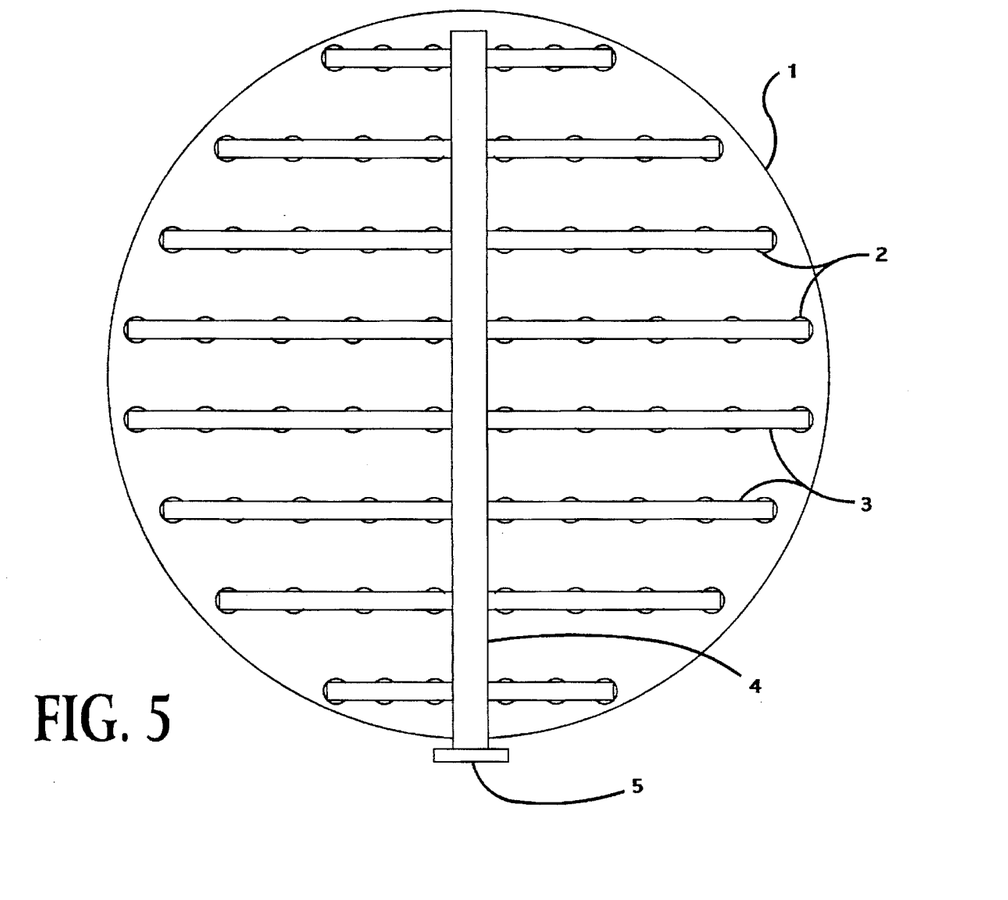
FIG. 5 is a plan view of a typical header-lateral distribution system.

Referring now to FIG. 5, a plan view of a typical header-lateral distribution system as described by Owens in Chapter 5 of Practical Principles of Ion Exchange Water Treatment is shown. Tank end 1 is preferably flat but may be curved. Header 4 is connected to a plurality of laterals 3. A plurality of strainers 2 are connected to each of the laterals. The strainers may be connected directly into the lateral pipes, or they may be connected to riser pipes extending from the lateral pipes.

Figure 6:
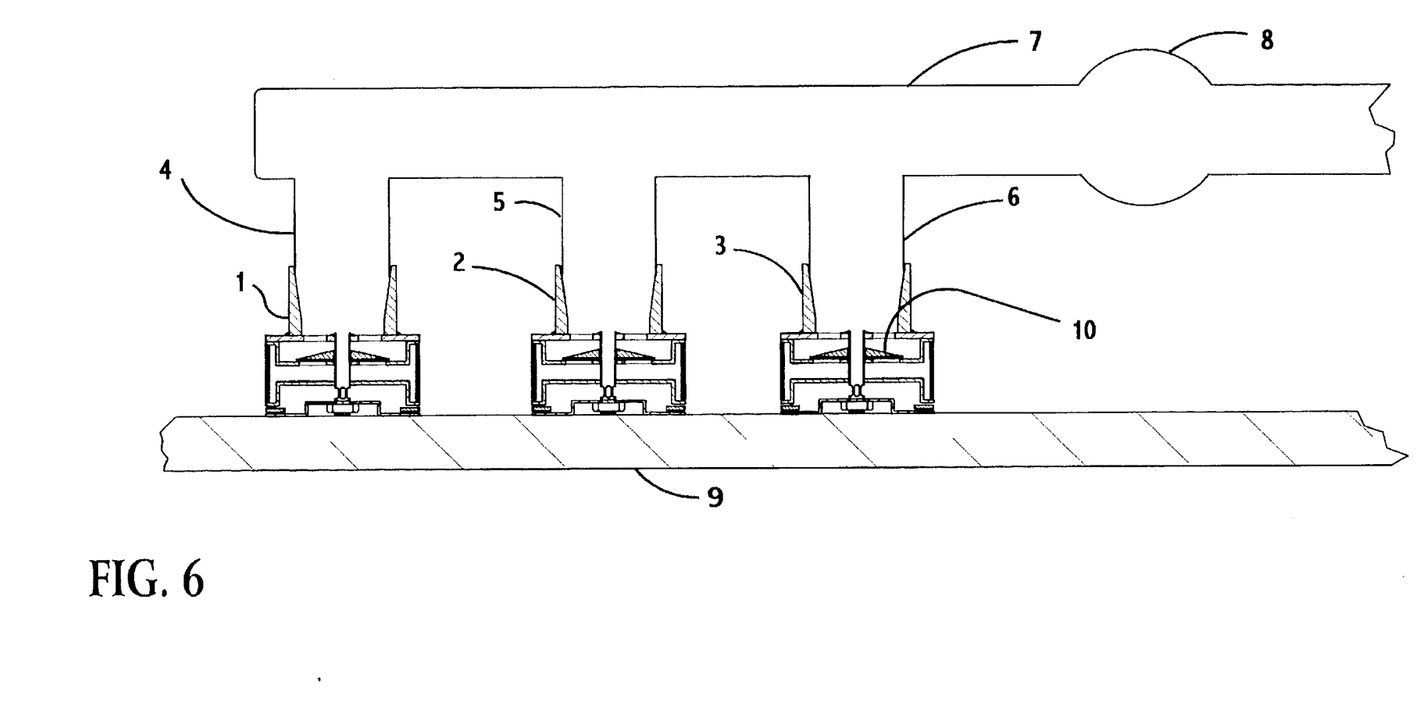
FIG. 6 is an elevational view, partially in section, of a portion of a header-lateral distribution system utilizing the invention in the lower portion of a flat-bottom tank.

Referring now to FIG. 6, a plurality of a preferred embodiment of the invention 1, 2, and 3, connected to risers 4, 5, and 6, which are connected to lateral 7 are shown. Lateral 7 is connected to header 8. The strainers 1, 2, and 3 are disposed adjacent to flat tank bottom 9.

Figure 7:
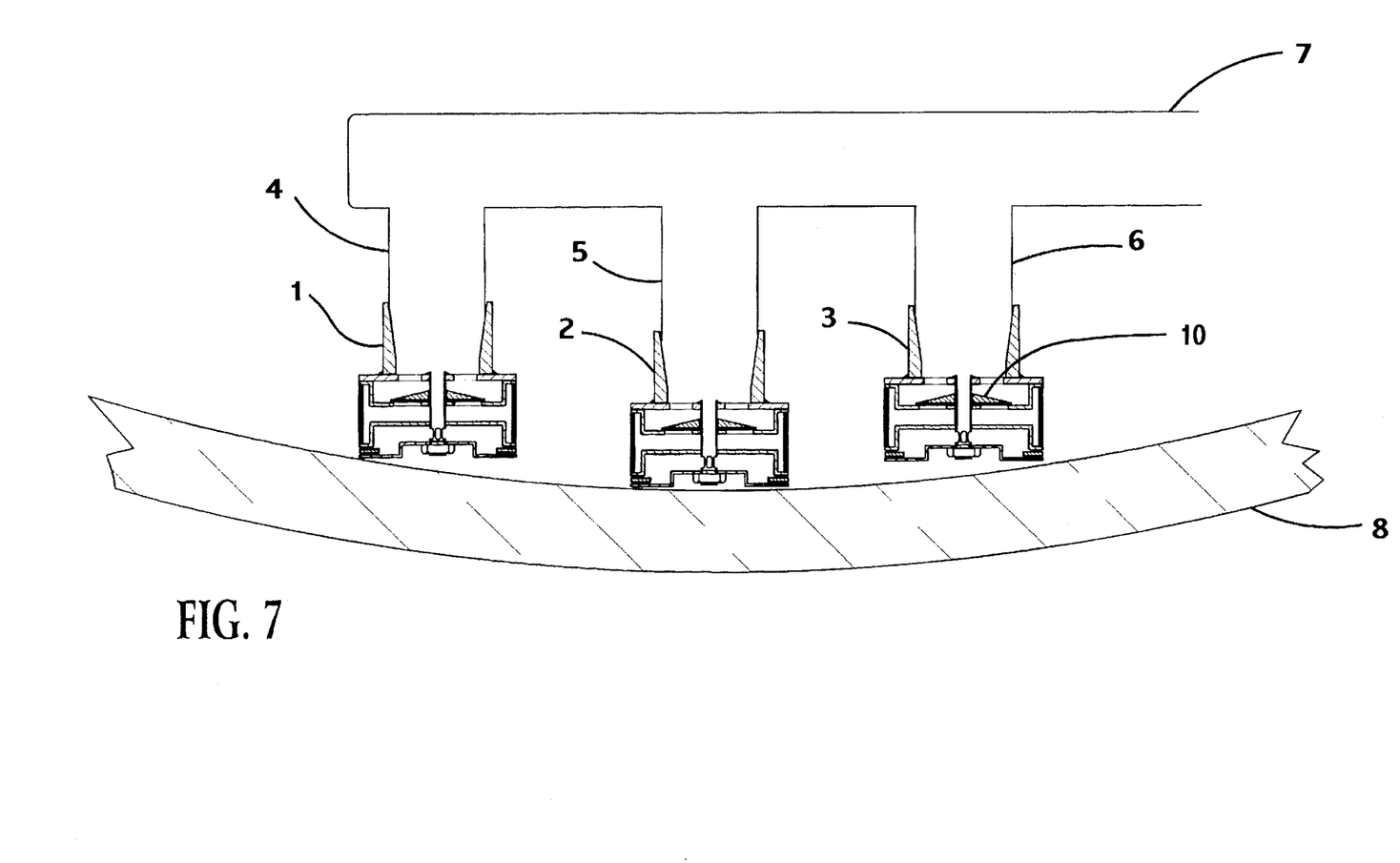
FIG. 7 is an elevational view, partially in section, of a portion of a header-lateral distribution system utilizing the invention in the lower portion of a curved-bottom tank.

Referring now to FIG. 7, a plurality of a preferred embodiment of the invention 1, 2, and 3, connected to risers 4, 5, and 6, which are connected to lateral 7 are shown. The strainers 1, 2, and 3 are disposed adjacent to curved tank bottom 9. Risers 4, 5, and 6 may be of different lengths to allow strainers 1, 2, and 3 to be as close to curved tank bottom 9 as possible.

Figure 8:
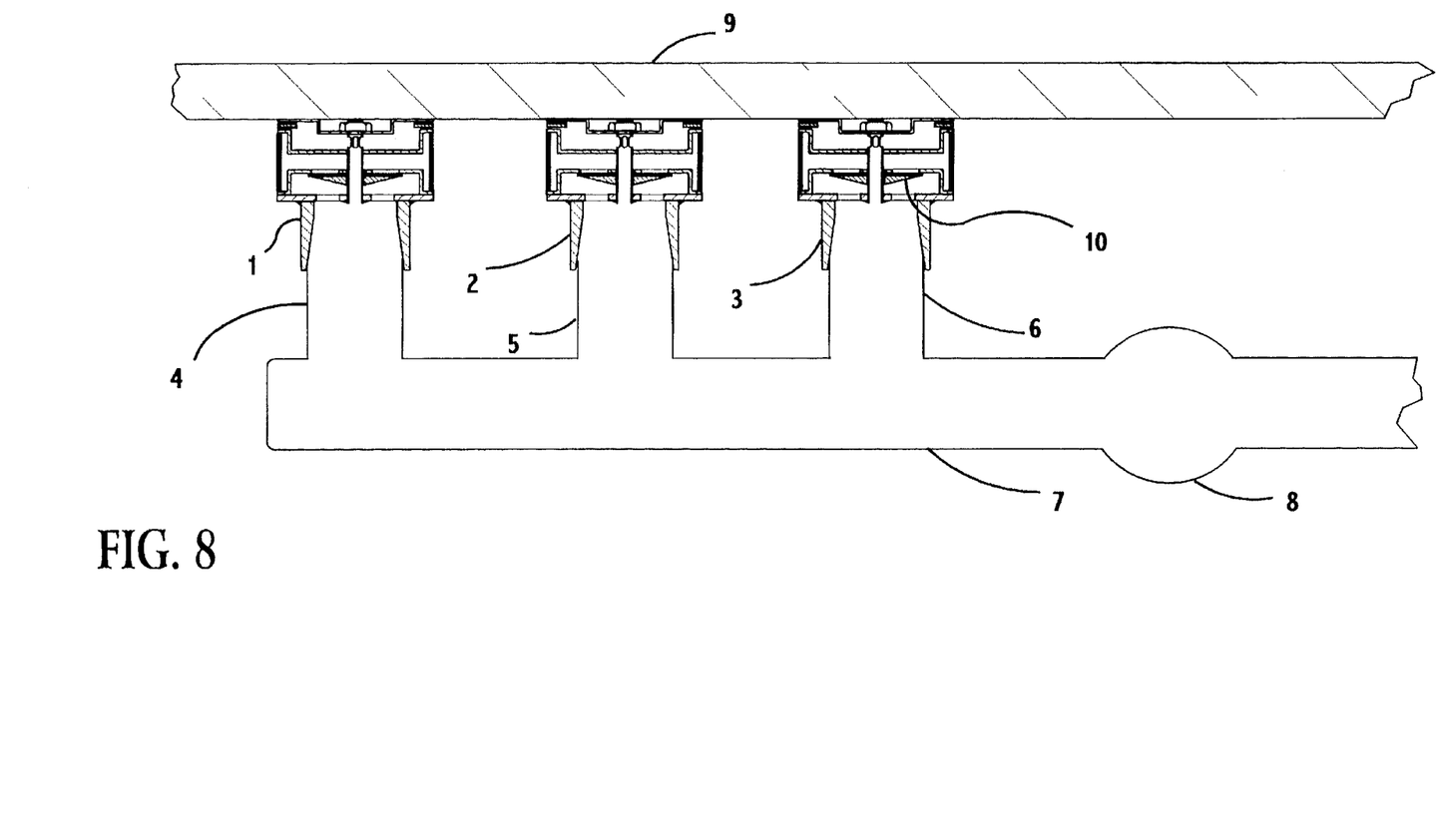
FIG. 8 is an elevational view, partially in section, of a portion of a header-lateral distribution system utilizing the invention in the upper portion of a flat-top tank.

Referring now to FIG. 8, a plurality of a preferred embodiment of the invention 1, 2, and 3, connected to risers 4, 5, and 6, which are connected to lateral 7 are shown. Lateral 7 is connected to header 8. The strainers 1, 2, and 3 are disposed adjacent to flat tank top 9. In this embodiment of the invention, check valve 10 may be constructed of a material such as high density polyethylene, which has a density less than that of most fluids which would be used in such systems, thus allowing check valve 10 to float to its closed position under static or low flow conditions in which the invention would be distributing fluids at a higher velocity.

Figure 9:
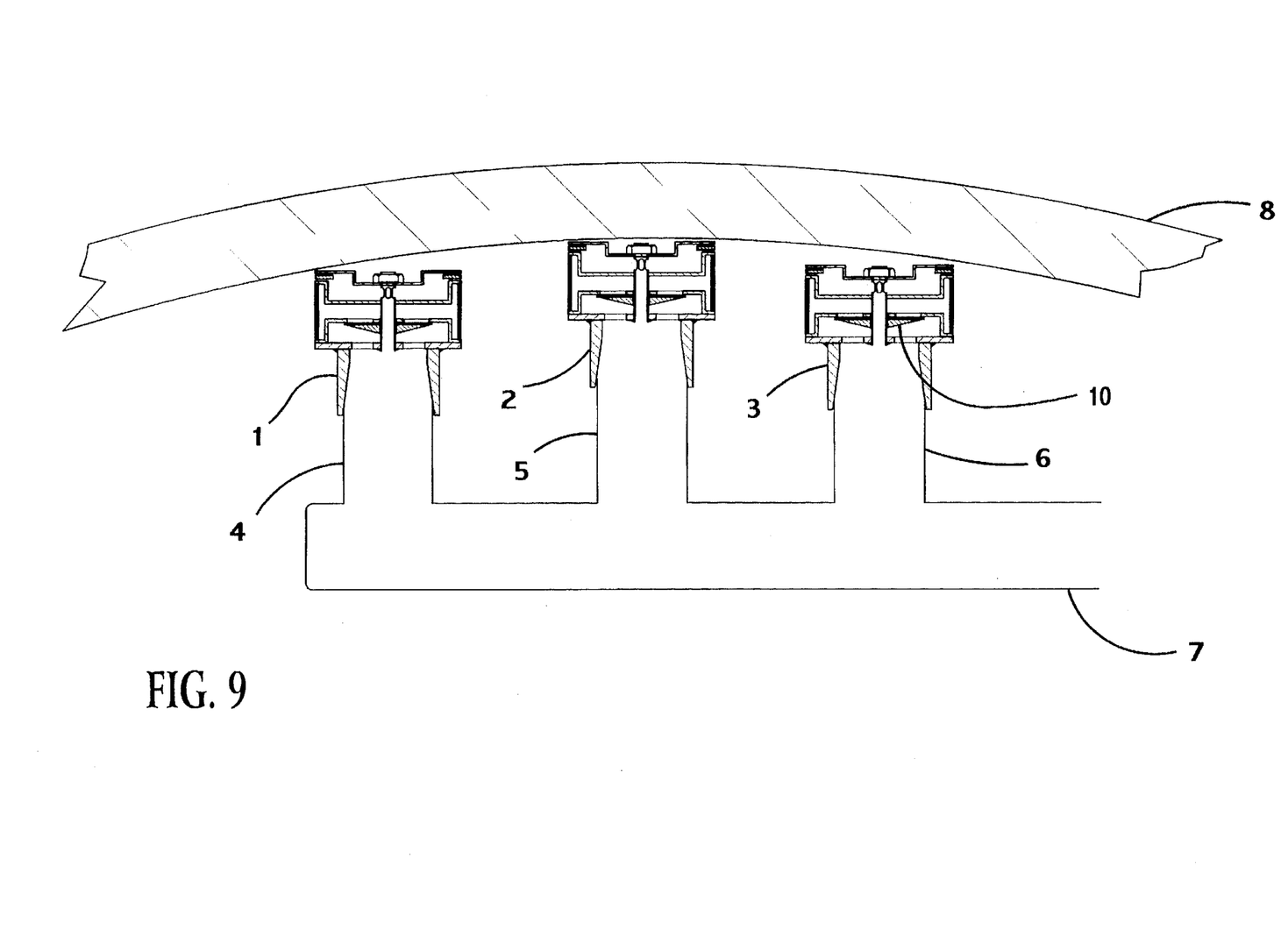
FIG. 9 is an elevational view, partially in section, of a portion of a header-lateral distribution system utilizing the invention in the upper portion of a curved-top tank.

Referring now to FIG. 9, a plurality of a preferred embodiment of the invention 1, 2, and 3, connected to risers 4, 5, and 6, which are connected to lateral 7 are shown. The strainers 1, 2, and 3 are disposed adjacent to curved tank top 9. Risers 4, 5, and 6 may be of different lengths to allow strainers 1, 2, and 3 to be as close to curved tank top 9 as possible. In this embodiment of the invention, check valve 10 may be constructed of a material such as high density polyethylene, which has a density less than that of most fluids which would be used in such systems, thus allowing check valve 10 to float to its closed position under static or low flow conditions in which the invention would be distributing fluids at a higher velocity.

Referring now to FIGS. 10 through 13, typical ion exchange flow diagrams in which the present invention may be used are illustrated.

Figure 10:
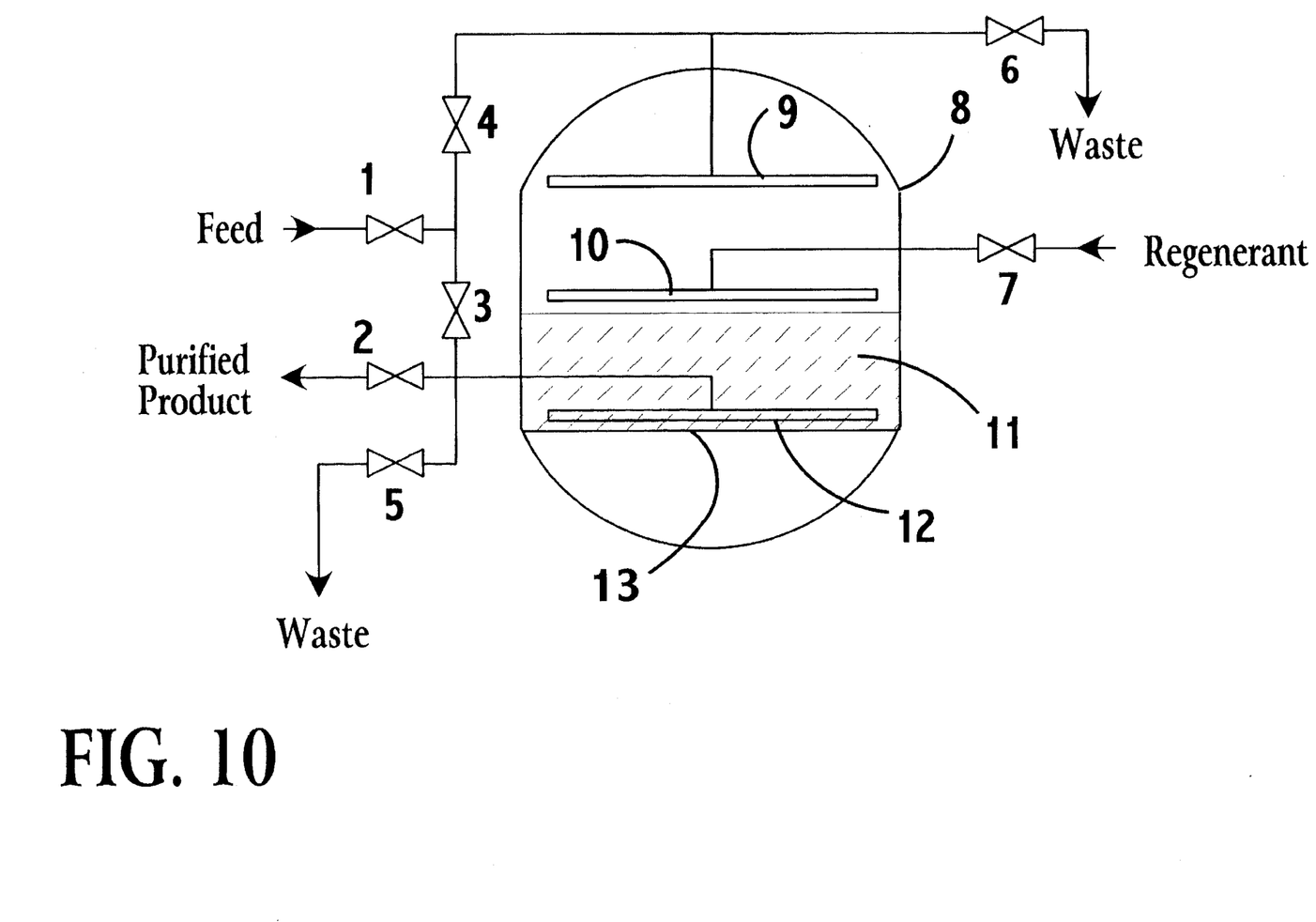
FIGS. 10 through 12 illustrate flow diagrams of typical ion exchange systems which may utilize the invention.

FIG. 10 shows a downflow regenerated ion exchange system consisting of pressure vessel 8, ion exchange resin bed 11, upper distributor 9, intermediate distributor 10, lower distributor system 12, and manifold valves 1–7. Vessel 8 may either have a flat false bottom, 14, or the ion exchange resin may be supported by a graded gravel bed. Feed liquid enters the vessel through valves 1,4 and distributor 9. After passing through the ion exchange bed, the liquid exits the system through distributor system 12 and valve 2. A regeneration cycle consists of a) backwash; b)regeneration; c) displacement rinse; and d) final rinse. The backwash supply may be either the feed supply or a separate source of water. Backwash fluid enters the system through valves 1, 3 and distributor system 12. The liquid passes upwardly through the resin bed, expanding the bed about 50 to 100%. Dirt and other fine materials are carried out of the system through distributor 9, valve 6 and to waste. Regeneration is carried out by pumping the appropriate regenerant chemical through valve 7, distributor 10, through resin bed 11, through distributor system 12, valve 5 and to waste. The regenerant may also be passed through the ion exchange resin bed by using a jet-pump type of eductor to draw concentrated regenerant chemical into the eductor where it is diluted by the motive flow of water and passed into the system. The displacement and final rinses may enter through valves 1, 3, distributor 9 and exits through distributor system 12, valve 9 and to waste. Alternatively, in the case of a system utilizing an eductor, the rinse water may enter through the regenerant distributor 10, by shutting off the source of chemical and allowing the motive flow of water to continue into the vessel. A plurality of the present invention would be installed in distributor system 12, in order to provide a high velocity fluid stream during the backwash cycle, thus providing an enhanced scrubbing and lifting action of the resin bed.

Figure 11:
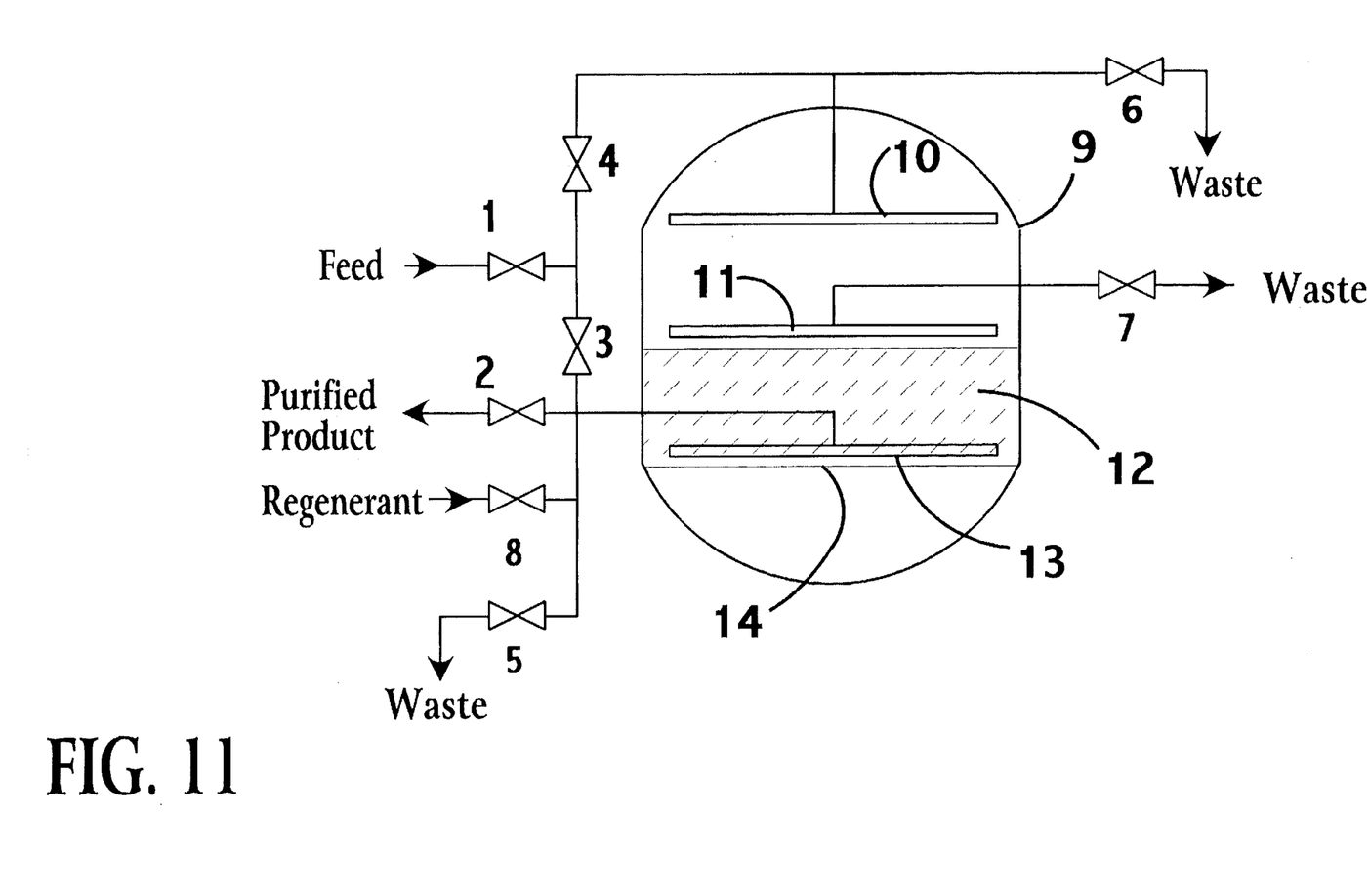

FIG. 11 illustrates a countercurrently regenerated ion exchange system consisting of pressure vessel 9, ion exchange resin bed 12, upper distributor 10, intermediate distributor 11, lower distributor system 13, and manifold valves 1–8. Vessel 9 preferably has a flat false bottom, 14, but an ion exchange resin support may also be supplied by a graded gravel bed. Feed liquid enters the vessel through valves 1,4 and distributor 10. After passing through the ion exchange bed, the liquid exits the system through distributor system 13 and valve 2. A regeneration cycle consists of a) regeneration; b) displacement rinse; and c) final rinse. The backwash cycle is limited to approximately once every ten regeneration cycles, or when increased pressure drop across the system dictates it. Backwashing the resin bed disturbs the exhausted resin zones and may result in increased leakage of ions on the subsequent service cycle. When backwashing is required, a double quantity of regenerant chemical is used to assure complete regeneration. When required, backwash fluid enters the system through valves 1, 3 and distributor system 13. The liquid passes upwardly through the resin bed, expanding the bed about 50 to 100%. Dirt and other fine materials are carried out of the system through distributor 10, valve 7 and to waste. Regeneration is carried out by pumping the appropriate regenerant chemical through valve 8, distributor system 13, through resin bed 12, through distributor 11, valve 7 and to waste. As in the downflow regenerated system, the regenerant may either be pumped into the system or drawn through an eductor. A plurality of the present invention may be installed in distributor system 13, which may be a hub-radial distribution system, but is more preferably a header lateral type as illustrated in FIG. 5. The dual velocity strainers would preferably be mounted on vertical riser pipes, extending downwardly from the lateral pipes.

Figure 12:
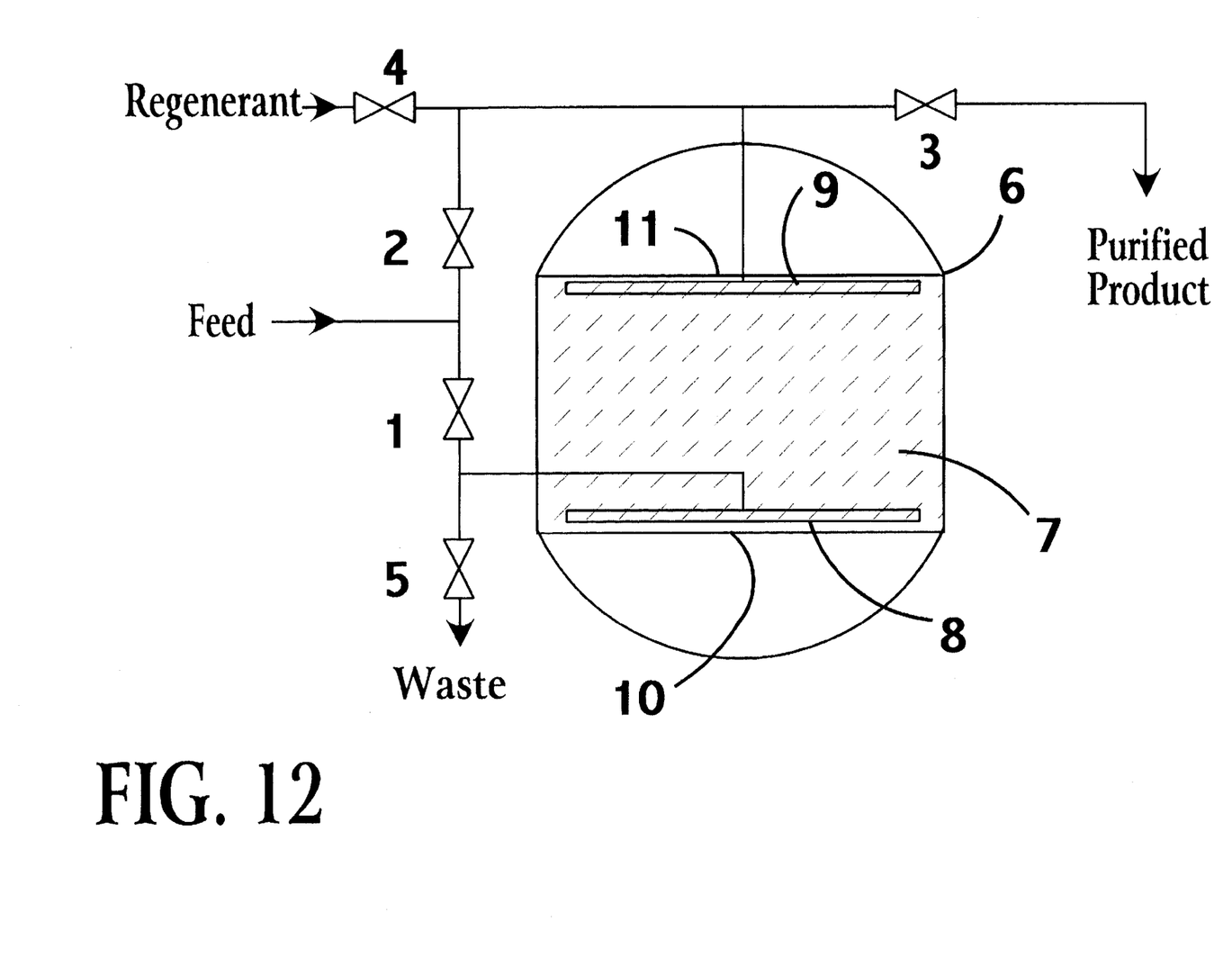

FIG. 12 illustrates a packed bed ion exchange system where the present invention may be used. The system consists of pressure vessel 6 with flat false top 11 and flat false bottom 10, ion exchange resin 7 lower distributor system 8, upper distributor system 9 and valves 1–5. Feed liquid enters through valve 1, distributor system 8, passes upwardly through packed ion exchange resin bed 7, and exits through distributor system 9 and valve 3. Regeneration is countercurrent to the feed flow with the regenerant entering through valve 4, distributor system 9, passing downwardly through packed ion exchange resin bed 7 and exiting the system through distributor system 8 and valve 5. The rinse follows the same basic path, but enters the system through valve 2. Dual velocity strainers may be used in both distribution systems in a packed bed ion exchange system, with the lower distribution system strainers extending vertically downwardly from the distributor pipes and the upper distribution system strainers extending vertically upwardly from the upper distributor pipes. The relatively low flow rate of the regenerant will be evenly dispersed across the cross sectional area of the vessel by exiting the upper distribution system at a relatively high velocity, thus providing complete contact of the regenerant with all of the ion exchange resin. The high flow rate of the feed stream entering the vessel through distributor system 8 will exit the dual velocity strainers at a very high velocity. This high velocity is necessary to provide a turbulent flow in the vicinity of the lower flat false tank bottom. As the ion exchange resin begins to exhaust, the resin may begin to slowly shrink, due to change in size from one ionic form to another. In order to minimize fluidization of the resin bed as the resin bed shrinks, a high velocity turbulent flow action is required to keep the resin bed packed against the flat false top and upper distribution system.

Spacing of the strainers in the above systems should be about one to two strainers for every square foot of vessel cross-sectional area, or more preferably about one strainer for every square foot of vessel cross-sectional area.

Although the specific features of the invention are shown in some drawings and not in others, it is for convenience only and each feature may be combined with any or all of the other features in accordance with the invention. It should be understood that the foregoing description of the invention is intended merely to be illustrative by way of example only and that other modifications, embodiments and equivalents may be apparent to those skilled in the art without departing from its spirit. It will be understood to those of ordinary skill in the art that other configurations may be substituted or added consistent with this invention.

Having thus described the invention, what I desire to claim and secure by Letters Patent is:

1. A dual velocity strainer for collecting a fluid at a first flow rate and distributing said fluid at a second flow rate in an environment comprising particulate matter, said strainer comprising:

(a) a substantially cylindrical fluid-distributing high velocity strainer portion having a fluid straining means comprising a plurality of openings for distributing said fluid at a relatively high velocity in a fluid flow path, said openings allow passage of said fluid while retaining said particulate matter, said high velocity strainer portion communicating with a coaxial compartment disposed radially inwardly therefrom, said coaxial compartment being further defined by first and second walls opposing each other and having a central opening for receiving a conduit therethrough;

(b) a substantially cylindrical fluid collecting low velocity strainer portion adjacent said second wall of said high velocity strainer portion, said low velocity strainer portion having a fluid straining means comprising a plurality of openings for collecting a fluid at a relatively low velocity in a fluid flow path, said openings allow passage of said fluid while retaining said particulate matter, said low velocity strainer portion communicating with a coaxial compartment disposed radially inwardly therefrom, said coaxial compartment being further defined by said second wall of said high velocity strainer portion and a check valve rest plate opposing said second wall, said rest plate having a central opening for receiving said conduit therethrough, said rest plate having a plurality of openings therethrough located radially from said central opening;

(c) a substantially cylindrical check valve compartment adjacent said check valve rest plate, said compartment defined by said check valve rest plate and a check valve restraining plate opposing said check valve rest plate, said check valve restraining plate having a central opening for receiving said conduit therethrough and a plurality of openings therethrough located radially from said central opening;

(d) said conduit disposed coaxially through said central opening in said first and second walls of said high velocity strainer portion, through said central opening of said check valve rest plate and through said central opening of said check valve restraining plate;

(e) a check valve having an axial opening therethrough, said check valve having a first substantially flat surface adapted to cover said plurality of openings of said check valve rest plate, a second surface angularly opposed to said first surface, said second surface adapted to prevent said check valve from covering said plurality of openings in said check valve restraining plate, said check valve being slidably mounted upon said conduit; and (f) a connecting means for connecting a surface of said check valve restraining plate to a fluid distribution and collection system.

2. The strainer as set forth in claim 1, wherein said check valve is comprised of a material with a density greater than the density of said fluid.

3. The strainer as set forth in claim 1, wherein said particulate matter comprises ion exchange resin.

4. The strainer as set forth in claim 1, wherein said first flow rate is slower than said second flow rate.

5. The strainer as set forth in claim 1, wherein said check valve is comprised of a material with a density less than the density of said fluid.

6. The strainer as set forth in claim 5, wherein said check valve comprises high density polyethylene.

7. The strainer as set forth in claim 1, wherein said strainer collects a first fluid at a first flow rate and distributes a second fluid at a second flow rate.

8. The strainer as set forth in claim 7, wherein said first flow rate is slower than said second flow rate.

9. The dual velocity strainer of claim 1, wherein said strainer is connected to a fluid distribution system.

10. The strainer as set forth in claim 9, wherein said check valve compartment is downwardly coupled to a lateral of said fluid distribution system.

11. The strainer as set forth in claim 9, wherein said check valve compartment is upwardly coupled to a lateral of said fluid distribution system.

12. The strainer as set forth in claim 7, wherein said first fluid is comprised of a liquid undergoing purification and said second fluid comprises a regenerant chemical.

13. The strainer as set forth in claim 12, wherein said regenerant chemical is an aqueous chemical solution.

14. The strainer as set forth in claim 13, wherein said aqueous chemical solution is selected from the group consisting of hydrochloric acid, sulfuric acid, nitric acid, phosphoric acid, sodium chloride, sodium carbonate, sodium hydroxide, potassium hydroxide and ammonium hydroxide.

15. The strainer as set forth in claim 14, wherein the concentration of said aqueous chemical solution is in the range from about 0.5% by weight to about 15% by weight.

16. A dual velocity strainer for connection to a fluid distribution system disposed in a housing containing particulate filtration media and comprising:

a high velocity strainer compartment having a fluid straining means;

a low velocity strainer compartment adjacent said high velocity strainer compartment and having a fluid straining means;

a check valve compartment adjacent to and in fluid communication with said low velocity strainer compartment and said fluid distribution system;

a conduit extending through said high velocity strainer compartment, said low velocity strainer compartment, and said check valve compartment, said conduit in fluid communication with said high velocity compartment and said fluid distribution system; and a check valve slidably mounted upon said conduit within said check valve compartment such that a fluid flowing from said fluid distribution system and into said check valve compartment forces said check valve to obstruct the fluid communication between said check valve compartment and said low velocity strainer compartment, thereby diverting said fluid into said conduit and through said high velocity strainer compartment.

17. The dual velocity strainer of claim 16, wherein said check valve compartment is downwardly coupled to a lateral of said fluid distribution system.

18. The dual velocity strainer of claim 16, wherein said check valve compartment is upwardly coupled to a lateral of said fluid distribution system.

19. The dual velocity strainer of claim 16, wherein said high velocity strainer compartment comprises a compartment coaxial with said conduit and defined by substantially cylindrical sidewalls having said straining means comprising a plurality of openings in fluid communication with said particulate filtration media and by opposing walls having a central bore for receiving said conduit therethrough.

20. The dual velocity strainer of claim 16, wherein said low velocity strainer compartment comprises a compartment coaxial with said conduit and defined by substantially cylindrical sidewalls having said straining means comprising a plurality of openings in fluid communication with said particulate filtration media and by a first wall and a second wall having a central bore for receiving said conduit therethrough, said second wall having a plurality of holes therethrough located radially from said central opening providing said fluid communication between said low velocity strainer compartment and said check valve compartment.

21. The dual velocity strainer of claim 16, wherein said check valve compartment comprises a coaxial compartment defined by substantially cylindrical sidewalls and further defined by opposing walls having a central opening for receiving said conduit therethrough, said opposing walls having a plurality of openings therethrough located radially from said central opening for providing said fluid communication between said check valve compartment, said low velocity strainer compartment and said fluid distribution system.

22. The dual velocity strainer of claim 16, wherein a portion of said conduit located within said high velocity compartment comprises a plurality of slots arranged circumferentially around said portion, thereby providing said fluid communication between said high velocity strainer compartment and said fluid distribution system.

* * * * *